United States Patent [19]
Kopp

[11] 4,275,641
[45] Jun. 30, 1981

[54] HYDRAULIC SERVO CYLINDER AND PISTON

[75] Inventor: Hanspeter Kopp, Spraitbach, Fed. Rep. of Germany

[73] Assignee: Zahnradfabrik Friedrichshafen AG, Friedrichshafen, Fed. Rep. of Germany

[21] Appl. No.: 968,411

[22] Filed: Dec. 11, 1978

[51] Int. Cl.³ ............................ F15B 15/22; F16J 1/00; F16J 9/02
[52] U.S. Cl. .............................. 91/400; 91/402; 92/136; 92/193; 92/250; 277/165; 277/194
[58] Field of Search ............... 91/400, 402; 92/193, 92/250, 258, 136, 151; 277/165, 194, 195, 168

[56] References Cited

U.S. PATENT DOCUMENTS

| | | | |
|---|---|---|---|
| 2,009,958 | 7/1935 | Hance | 92/255 X |
| 2,509,672 | 5/1950 | Christensen | 277/165 |
| 2,607,644 | 8/1952 | Smith et al. | 277/165 |
| 3,388,915 | 6/1968 | Dega | 92/258 X |
| 3,656,414 | 4/1972 | Muller | 92/193 X |
| 3,818,805 | 6/1974 | Johansson | 91/402 |
| 4,069,747 | 1/1978 | Forry et al. | 92/255 X |

FOREIGN PATENT DOCUMENTS

| | | |
|---|---|---|
| 938527 | 2/1956 | Fed. Rep. of Germany . |
| 32558 | 5/1956 | Fed. Rep. of Germany ........... 277/194 |
| 112646 | 1/1918 | United Kingdom ...................... 91/402 |

*Primary Examiner*—Irwin C. Cohen
*Attorney, Agent, or Firm*—Zalkind & Shuster

[57] ABSTRACT

A servo cylinder having a piston of the kind having spaced sections which move into an enlarged diameter low pressure bore portion of the cylinder is provided with a gasket assembly for each piston section in the form of an elastic sealing gasket having a resiliently flexible radial flange extending from an integral collar and supported by a rigid ring having a certain circumferential clearance from the collar to permit radial movement for misalignment compensation. The gasket may be formed in the cross-sectional shape of an L or of a T. Where an L-shape is used, a single support ring is provided and where a T-shape is used a support ring on each side of the radially extending flange which forms the leg of the T oriented 90° would be used. The ring or rings are protective of the radial flange in either direction of movement of the respective piston.

6 Claims, 2 Drawing Figures

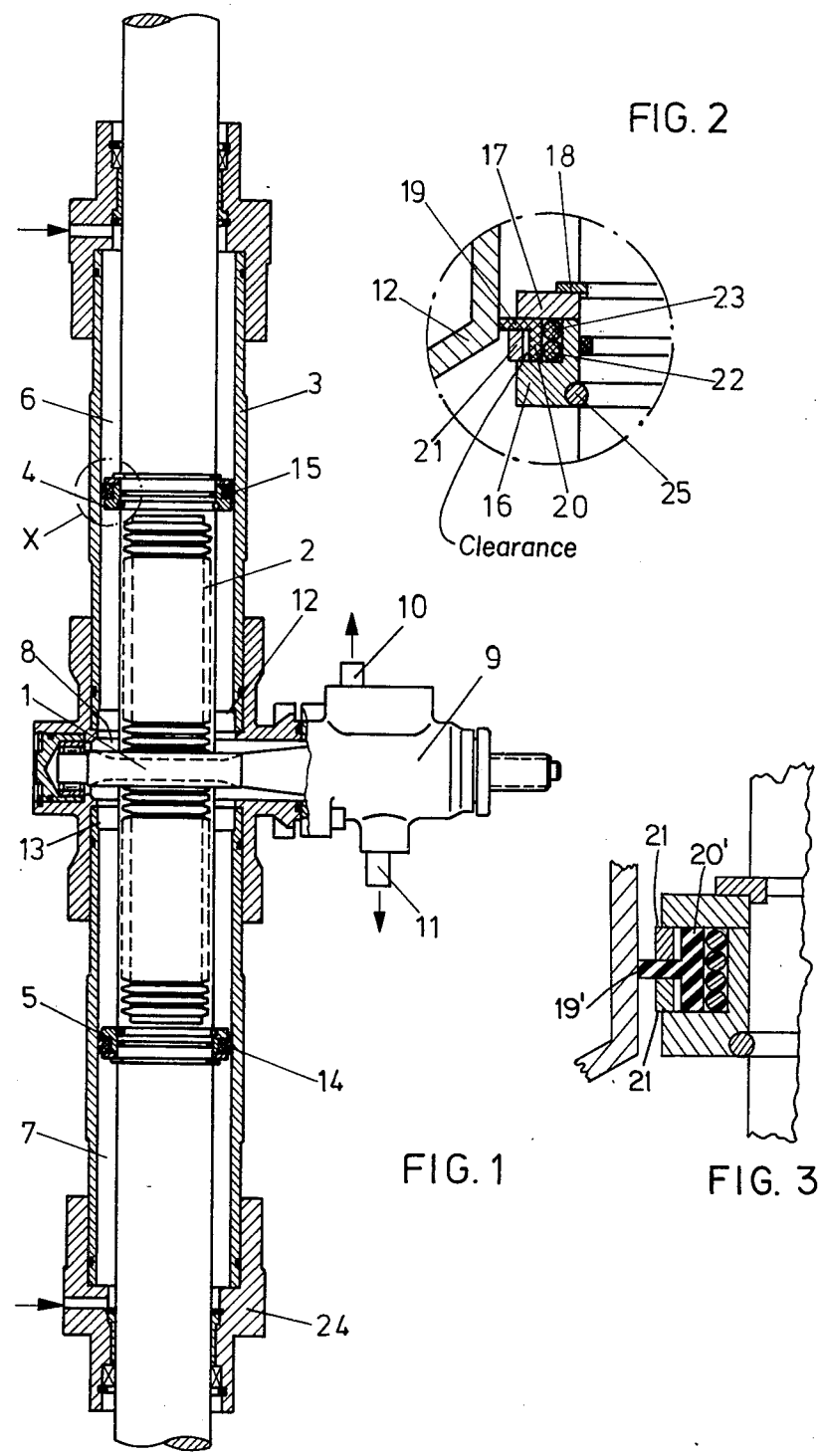

HYDRAULIC SERVO CYLINDER AND PISTON

The prior art as exemplified in the German patent to Lincoln et al, German Pat. No. 938,527, shows an arrangement wherein the cylinder has a groove to permit flow from the high pressure to the low pressure side of the piston at the end of a piston stroke. However, in such prior art piston rings have been used of a rigid material which do not effect good sealing and are relatively susceptible to breakdowns. Further, there is considerable piston-cylinder contact friction. In the case of long piston strokes as used in gear rack type steering mechanisms of the kind disclosed in the present application, the wear becomes even greater should there be any misalignment of the piston in the cylinder.

On the other hand, where ordinary sealing gaskets are carried by the piston and made of an elastic material there is the danger that upon return movement of the piston from the enlarged diameter portion of the cylinder they may suffer misalignment, being thus pulled out of proper seated position in the piston and eventually severed. Additionally, conventional sealing gaskets as ordinarily used can be destroyed by the high velocity oil flow at the end of the stroke when oil moves from the high pressure region to the low pressure region past the piston.

In general, the problems in this art relate to the slowing or damping of the piston movement toward the end of its stroke before the steering mechanism has been actuated to an extreme position under heavy pressure. Where there is no pressure relief there is danger of a rise in pressure acting on the piston which cannot be tolerated for the reason that it can bring about conditions causing deformation or even destruction of the steering housing or the frame of the vehicle.

The present invention affords a safely operating cylinder, relatively friction free in piston movement and insuring a good seal, all brought about by a relatively simple construction in which an elastic gasket of L or T-shape is utilized in the combination disclosed.

Briefly, each piston section has a groove and a radially extending resilient flange extending into sealing contact with the cylinder wall and buttressed by a support ring which has radial movement to compensate for piston and cylinder misalignment. Each such ring extends beyond the exterior wall of the piston but has less than the flange diameter. The flange and an integral base or support collar effect a sealing gasket.

As a matter of durability, the rigid ring prevents the gasket flange from being radially pulled away from the piston by oil flow as the gasket moves into the enlarged diameter low pressure bore portion of the cylinder. Similarly, the ring prevents the gasket flange from being pulled away from the piston on the return stroke which is not a power stroke of that section of the piston but effected by pressure on the other piston section. Additionally, the radial clearance permitted between the ring and the gasket collar permits a desired degree of radial movement of the gasket to compensate for possible misalignment of the piston and cylinder.

In the specific construction it has been found to be of advantage to use one or more elastic O-rings intermediate the gasket collar and the bottom of the piston groove. This provides additional flexibility of radial movement for the gasket and permits the compensating of alignment errors without increased friction during piston movement, as well as increasing the sealing effect.

Thus, the invention effects a uniform and rapid drop in the working oil pressure as soon as the gasket flange moves into the enlarged diameter bore portion of the cylinder which extends around the entire inner periphery of the cylinder. The transition point from the pressurized cylinder bore to the enlarged diameter bore can be provided with an edge of sharpness commensurate with whatever predetermined rapidity of pressure drop may be desired. An arbitrarily controlled rapidity of pressure drop can be predetermined by the diameter increase provided for the enlarged bore portion.

A detailed description of the invention now follows in conjunction with the accompanying drawing in which:

FIG. 1 illustrates a longitudinal section through a double-acting servo cylinder in a steering gear housing of a motor vehicle utilizing a relatively elongated piston rod which extends through both ends of the housing and has a piston comprised of spaced piston sections thereon;

FIG. 2 is an enlarged sectional illustration showing detailed structure within the phantom circle X of FIG. 1 to illustrate the gasket invention using an L-shaped gasket, and FIG. 3 is an illustration of a T-shaped gasket.

The arrangement comprises the conventional pinion 1 and rack 2 within a two-section steering gear housing 3 which effects the cylinder of the mechanism. The rack is a portion of the piston rod shown as extending through the ends of the housing. The rod carries a piston having spaced piston sections 4 and 5 in respective pressure chambers 6 and 7, all conventional.

At the center of cylinder is a low pressure chamber 8 connecting with an exhaust line (not shown). At each inner end of the housing sections in which a piston section operates and adjacent to pinion 1 there are diametrically enlarged bore portions of the cylinder bore effecting low pressure chambers 12 and 13 connecting with chamber 8 which coacts with respective piston sections 4 and 5. It will be understood that these low pressure chambers are for respective cylinder sections and that when a piston section, for example, piston section 4, is pressurized by pressure introduced into pressure chamber 6, the piston section moves downwardly and ultimately may move past the transition point which leads to the enlarged diameter cylinder portion forming the low pressure chamber 12. However, the enlarged diameter need not extend completely around the cylinder periphery.

At that time, high pressure from chamber 6 escapes past the piston section through the low pressure exhaust region of chamber 8 and the pressure force on the piston is then quickly relieved. The coaction between piston section 5, high pressure chamber 7 and low pressure chamber 13 is, of course, the same as above described for pressure release, the chamber communicating to exhaust.

In the usual manner high pressure lines 10 and 11 under control of valve 9 connect to the inlets indicated by arrows in FIG. 1 for the respective high pressure chambers 6 and 7.

Thus, it will be understood that the spaced piston arrangement is reciprocally operable and when, for example, piston section 4 is in downward position, piston section 5 will meet the end ring 24 of the housing to limit movement, and vice versa for opposite movement.

It will be noted that the pressure chambers 6 and 7 are disposed so as to extend almost to the pinion 1 in order to assure sufficient spacing for either piston section to move so that the gasket 19-20 (FIG. 2) to be described, will escape the edge of the transition point between the piston bore and the respective enlarged diameter bore demarcating low pressure chambers 12 and 13.

Referring to FIG. 2, the piston sections 4 and 5 carry respective gasket assemblies 14 and 15 in the grooves provided as described below. It will be noted that the piston section 4 is in position in the cylinder bore adjacent the transition point to the low pressure chamber 12.

Each piston section is comprised of two ringlike members 16 and 17, member 16 being L-shaped so as to form a groove as shown, and wherein the gasket assembly comprises retaining rings 18 and 25 fitted into respective grooves on the piston rod to secure members 16 and 17. A sealing gasket, L-shaped in cross-section, of elastic material, is carried in the groove between members 16 and 17, wherein a portion 19 is a flexible and resilient radial flange engaging the cylinder bore, extending from a base portion which is an integral circumferential collar 20. The assembly is all locked between rings 18 and 25 for each piston section, each such assembly being, of course, a mirror image of the other.

Intermediate a collar 20 and the bottom of its carrying groove are a pair of O-rings 22 and 23 arranged in tandem, as shown, which augment the sealing effect.

The assembly for each piston section is completed by a rigid ring 21 which surrounds the collar 20 and is spaced radially therefrom with a clearance of approximately 0.2 mm. and radially displaceable to the extent permitted by the clearance to compensate for misalignment. The ring 21 does not of itself have any sealing function, but will be noted to extend beyond the confines of the piston section exterior to engage flange 19 serving to buttress the resilient flange 19 when hydraulic pressure is exerted in chamber 6 or 7 and also serving to reinforce the radial flange when the respective piston moves from the enlarged bore of the cylinder into the respective pressure chamber 6 or 7, past the transition point. It will be apparent that when a respective flange 19 moves past the transition point into low pressure chamber 12 or 13 a gap is formed through which high pressure fluid can escape into the low pressure chamber 8, to quickly relieve force applied on the entire mechanism. The respective ring 21 prevents rapidly moving oil from pulling the gasket flange from proper position. Similarly, when a piston section moves past the transition point into a pressure chamber 6 or 7 the effect of the respective ring 21 is to prevent pulling out or flange distortion in being forced through the transition point against the edge of the smaller bore of a pressure chamber.

FIG. 3 sectionally illustrates the modification wherein a 90° oriented cross sectionally T-shaped gasket with flange 19' and the cross bar 20' as an integral dual collar is carried in an elongated groove of the piston and the flange has a rigid ring 21' on each side, which as in FIG. 2, extend beyond the piston exterior as in the case of ring 21. Here again the clearance permits radial compensating movement for misalignment being effective on both sides of the flange.

From the preceding description, it will be apparent that certain changes can be made within the spirit of the invention. For example, while it has been found advantageous to incorporate O-rings, this is not essential. Also, while the radial flange must, of course, be resilient in order to provide good sealing engagement and yet move past the transition point between high and low pressure chambers, it is of course conceivable that the collar with which it is preferably integral can be stiffer. It is known technology that portions of an integral elastic member may be manufactured so as to be more resilient than other portions.

What is claimed is:

1. In a double-acting hydraulic servo cylinder of the kind having continuously cylindrical high pressure chambers for travel of a piston under pressure force and wherein said chambers extend to an intermediate continuously cylindrical low pressure chamber of said cylinder; including a piston in each chamber disposed for travel therein and connected to a common output with each piston carrying a sealing gasket assembly movable sufficiently past the transition between respective high pressure chambers and the low pressure chamber to effect a pressure relief flow from said high pressure chambers to said low pressure chamber toward the end of a pressure stroke of said piston;

the improvement wherein:

each sealing gasket assembly comprises a seal of flexible and resilient material having a collar mounted in a groove on said piston and having an integral radial flange extending therefrom to resiliently and sealingly engage said cylinder in said high pressure chambers and wherein said flange is of a diameter to preclude sealing in said low pressure chamber when moving thereinto so as to permit relief flow from said high pressure to said low pressure chamber for preventing excess pressure force being exerted on said piston; said sealing gasket assembly including support ring means on said piston encompassing said collar with predetermined radial clearance, extending beyond the piston exterior in supporting engagement with said flange and a wall of said groove, spaced from said cylinder with radial clearance, and radially displaceable to compensate for piston and cylinder misalignment.

2. In a hydraulic servo cylinder as set forth in claim 1, wherein said integral collar and flange are L-shaped in cross section.

3. In a hydraulic servo cylinder as set forth in claim 1, wherein the integral collar and flange is T-shaped in cross section and disposed within said assembly so that the cross of the T effects said collar and the leg of the T effects said flange, said support ring means including a support ring on each side of said flange.

4. In a hydraulic servo cylinder as set forth in claim 1, including at least two resilient O-rings circumferentially intermediate said collar and said piston.

5. In a hydraulic servo cylinder as set forth in claim 3, including at least two resilient O-rings circumferentially intermediate said collar and said piston.

6. An improved piston for a servo cylinder comprising a groove and a gasket assembly carried therein; said gasket assembly comprising a sealing member having a collar circumferentially disposed in said groove and having a flexible resilient flange extending radially beyond the exterior of said piston adapted to sealingly engage the wall of a cylinder; including support ring means in said groove and encompassing said collar with a predetermined radial clearance therefrom and radially displaceable with respect thereto to compensate for misalignment of piston and cylinder, said support ring means engaging a wall of said groove and said flange for support thereof and extending beyond the exterior of said piston; said resilient flange extending radially beyond the exterior of said support ring means whereby said supporting ring means is adapted to be radially spaced from the wall of a cylinder.

* * * * *